(12) United States Patent
Beck et al.

(10) Patent No.: US 11,336,086 B2
(45) Date of Patent: May 17, 2022

(54) CURRENT LIMITING CIRCUIT FOR LIMITING THE MAGNITUDE OF AN ALTERNATING CURRENT

(71) Applicant: Siemens Energy Global GmbH & Co. KG, Munich (DE)

(72) Inventors: Michael Beck, Winkelhaid (DE); German Kuhn, Erlangen (DE); Priyanka Gugale, Erlangen (DE); Juan Pablo Ricon Castejon, Nuremberg (DE); Kunal Sharma, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 532 days.

(21) Appl. No.: 16/330,458

(22) PCT Filed: Sep. 5, 2016

(86) PCT No.: PCT/EP2016/070851
§ 371 (c)(1),
(2) Date: Mar. 5, 2019

(87) PCT Pub. No.: WO2018/041372
PCT Pub. Date: Mar. 8, 2018

(65) Prior Publication Data
US 2021/0288490 A1   Sep. 16, 2021

(51) Int. Cl.
*H02H 9/02*   (2006.01)
(52) U.S. Cl.
CPC .............. *H02H 9/028* (2013.01); *H02H 9/02* (2013.01)

(58) Field of Classification Search
CPC .......... H02H 9/02; H02H 9/025; H02H 9/023; H02H 9/028; H02H 3/08; H01H 9/104;
(Continued)

(56) References Cited

U.S. PATENT DOCUMENTS 3,957,329 A * 5/1976 McConnell ............ H02H 9/028
361/16
5,392,184 A * 2/1995 Unterlass ................. H02H 7/16
361/16

(Continued)

FOREIGN PATENT DOCUMENTS

EP   2983262 A1   2/2016
RU   2340027 C1   11/2008
(Continued)

OTHER PUBLICATIONS

S. Sugimoto; J. Kida; H. Arita; C. Fukui; T. Yamagiwa; "Principle and characteristics of a fault current limiter with series compensation"; IEEE; IEEE Transactions on Power Delivery (vol. 11, Issue: 2, Apr. 1996); pp. 842-847 (Year: 1996).*

(Continued)

*Primary Examiner* — Thienvu V Tran
*Assistant Examiner* — Shahzeb K Ahmad

(57) ABSTRACT

A current-limiting circuit for limiting the magnitude of an alternating current. The circuit includes a coil unit and a capacitor unit, which are connected electrically in series, and a bypass device for electrically bridging the capacitor unit on occasion of an overcurrent. The bypass device has a first bypass branch and a second bypass branch connected electrically in parallel with the first bypass branch. A third bypass branch is connected electrically in parallel with a second bypass element of the second bypass branch.

20 Claims, 4 Drawing Sheets

(58) Field of Classification Search
CPC ....... H01H 9/108; H01H 87/00; H02J 7/0068; H02J 9/061
See application file for complete search history.

(56) References Cited

U.S. PATENT DOCUMENTS

| | | | |
|---|---|---|---|
| 2015/0077889 A1* | 3/2015 | Kauffman | H03H 7/075 361/56 |
| 2016/0013635 A1* | 1/2016 | Isojima | H02H 3/08 505/211 |
| 2016/0181864 A1* | 6/2016 | Reddy | H02J 9/061 307/66 |
| 2017/0178844 A1* | 6/2017 | Angquist | H02H 3/08 |
| 2018/0019589 A1* | 1/2018 | Landwer | H01F 27/42 |
| 2019/0115191 A1* | 4/2019 | Mavretic | H01L 21/31116 |

FOREIGN PATENT DOCUMENTS

| | | |
|---|---|---|
| SU | 99691 A1 | 11/1954 |
| SU | 261533 A1 | 1/1970 |
| WO | 2006010725 A1 | 2/2006 |
| WO | WO-2006010725 A1 * | 2/2006 ............ H02H 9/028 |
| WO | 2016120880 A1 | 8/2016 |

OTHER PUBLICATIONS

Alexander Abramovitz; Keuye Ma Smedley; "Survey of Solid-State Fault Current Limiters"; Nov. 4, 2011; IEEE; IEEE Transactions on Power Electronics (vol. 27, Issue: 6, Jun. 2012); pp. 2770-2782 (Year: 2011).*

Chunyang Gu; Pat Wheeler; Alberto Castellazzi; Alan J. Waston; Francis Effah; "A survey on configurations of current-limiting circuit breakers (CL-CB)"; Sep. 5, 2016 2016 18th European Conference on Power Electronics and Applications (EPE'16 ECCE Europe); pp. 1-13 (Year: 2016).*

Sugimoto, S. et al.: Principle and Characteristics of a Fault Current Limiter with Series Compensation11, IEEE Transactions on Power Delivery, IEEE Service Center, New York, NY, US, Bd. 11, Nr. 2 Seiten 842-847, XP011049133, ISSN: 0885-8977 das ganze Dokument; 1996.

* cited by examiner

CURRENT LIMITING CIRCUIT FOR LIMITING THE MAGNITUDE OF AN ALTERNATING CURRENT

BACKGROUND OF THE INVENTION

Field of the Invention

Increasingly higher electrical powers are transmitted over power supply systems. Owing to ever higher electrical powers being fed into the systems and owing to the systems being connected to one another, the risk also increases that ever higher fault currents occur in the event of faults, in particular that ever higher short-circuit currents occur in the event of short circuits. The occurrence of faults on electrical power supply systems is unavoidable however. Firstly, damage may occur in the direct vicinity of the faults, for example owing to arcs. Secondly, the high fault currents flowing into the power supply systems at the point of the fault cause significant dynamic and thermal loading of the components in the system. It is therefore important to limit the magnitude of the currents occurring in the event of a fault. For current limitation, it is generally known to use coils or transformers with a high impedance. However, these coils or transformers have a notable influence on the currents flowing in the system even during normal operation of the power supply system and impair the load flow through the system.

SUMMARY OF THE INVENTION

The invention is based on the object of specifying a current-limiting circuit and a method by means of which the magnitude of a current occurring in a power supply system can be limited in a safe and reliable manner.

This object is achieved according to the invention by a current-limiting circuit and by a method as claimed in the independent patent claims. Advantageous embodiments of the current-limiting circuit and the method are specified in the dependent patent claims.

A current-limiting circuit is disclosed for limiting the magnitude of an alternating current comprising a coil unit and a capacitor unit, which are connected electrically in series, and a bypass device for electrically bypassing the capacitor unit in the event of the occurrence of an excess current. In this case, the bypass device can be connected electrically in parallel with the capacitor unit. This current-limiting circuit has the advantage that, when the bypass device is open, the series circuit comprising the coil unit and the capacitor unit is effective for the alternating current, whereas when the bypass device is closed, only the coil unit is effective for the alternating current.

The current-limiting circuit can be configured in such a way that the capacitor unit has such a capacitance and the coil unit has such an inductance that, at the rated frequency of the alternating current, the absolute value of the capacitive reactance of the capacitor unit corresponds to the absolute value of the inductive reactance of the coil unit. In other words, the capacitive reactance of the capacitor unit (at the rated frequency of the alternating current) compensates for the inductive reactance of the coil unit. As a result, the current-limiting circuit outwardly has a very low impedance (in the ideal case the impedance is zero) because the capacitive reactance and the inductive reactance compensate for one another (when the bypass device is open). Therefore, the alternating current (or the flow of alternating current) is not impaired or is only impaired to a very low degree when the bypass device is open.

The current-limiting circuit can be configured in such a way that the bypass device has a first bypass branch for bypassing the capacitor unit, wherein the first bypass branch has a first bypass element, in particular a power semiconductor switch.

The first bypass branch can be connected in parallel with the capacitor unit. The power semiconductor switch can have semiconductor valves (connected back-to-back in parallel) which can be switched on and off, in particular thyristors. A first damping circuit (in particular a further coil unit) can be connected electrically in series with the power semiconductor switch. This first damping circuit limits the current flow through the power semiconductor switch. The first damping circuit is arranged in the first bypass branch. The capacitor unit can be short-circuited in the event of the occurrence of an excess current by means of the first bypass element. It is particularly advantageous to configure the first bypass element as a power semiconductor switch because the capacitor unit can be bypassed particularly quickly using a power semiconductor switch. A power semiconductor switch can be switched on (i.e. closed) very, for example switch-on times of less than one millisecond can be achieved.

The current-limiting circuit can also be configured in such a way that the bypass device has a second bypass branch for bypassing the capacitor unit, wherein the second bypass branch is connected electrically in parallel with the first bypass branch, and the second bypass branch has a second bypass element, in particular a spark gap. The second bypass branch can have a (second) damping circuit arranged electrically in series with the spark gap. The (second) damping circuit is used for limiting the discharge current of the capacitor unit which flows through the spark gap on triggering of the spark gap. The capacitor unit can be bypassed by means of the second bypass branch if the first bypass branch should fail owing to a fault. It is particularly advantageous to use a spark gap as second bypass element because a spark gap can bypass the capacitor unit quickly (in comparison with a mechanical bypass switch) and in addition can be subjected to a high load for a short period of time.

The current-limiting circuit can also be configured in such a way that the bypass device has a third bypass branch for bypassing the second bypass element, wherein the third bypass branch is connected electrically in parallel with the second bypass element, and the third bypass branch has a third bypass element, in particular a mechanical bypass switch.

Advantageously, a bypass of the capacitor unit (bypass branch of the capacitor unit) which can conduct the flowing current even over a relatively long period of time can be realized by means of the third bypass branch. In this case, the third bypass element is advantageously configured in such a way that said third bypass element has a very low nonreactive resistance in the switched-on state (closed state). Advantageously, a mechanical bypass switch can be used as such a third bypass element since very low nonreactive resistances can be achieved by means of a mechanical bypass switch, in particular lower resistances than can be achieved using a power semiconductor switch or using a spark gap.

The current-limiting circuit can also be configured in such a way that the capacitor unit is provided with a surge limiter, in particular with a varistor. As a result, the capacitor unit can be protected in a reliable manner from surges, which in particular extends the life of the current-limiting circuit.

The current-limiting circuit can also be configured in such a way that the coil unit has two electrical coils connected in parallel. Advantageously, it is possible to identify, by means of two such electrical coils connected in parallel, if one of the coils has a fault (for example a turn-to-turn fault) because in this case the ratio of the electrical currents flowing through the two coils changes.

The current-limiting circuit can have a control unit, which is configured in such a way that the control unit generates a first bypass signal when the electrical current flowing through the coil unit exceeds a first threshold value, wherein the first bypass signal is intended to cause the first bypass element to close (in particular the power semiconductor switch to close). In the event of the occurrence of an excess current (i.e. in the event of the occurrence of a current which exceeds the first threshold value), the first bypass signal is generated by means of such a control unit and thereby a command to close the first bypass element is emitted.

The control unit can be configured in such a way that the control unit generates the first bypass signal (additionally) even when the electrical current flowing through the surge limiter exceeds a second threshold value. In this configuration, the first bypass signal is therefore generated when the electrical current flowing through the coil unit exceeds a first threshold value or when the electrical current flowing through the surge limiter exceeds the second threshold value. The electrical current flowing through the surge limiter exceeds the second threshold value when a surge occurs across the capacitor unit and therefore the surge limiter of the capacitor unit becomes active. This advantageously ensures that the bypass device closes even when, for example, an error occurs in the measurement of the electrical current flowing through the coil unit and therefore it is not identified that the first threshold value has been exceeded.

The control unit can be configured in such a way that the control unit generates a second bypass signal, wherein the second bypass signal is intended to cause the second bypass element to close (in particular to cause triggering of the spark gap) when the first bypass element does not close in response to the first bypass signal (for example owing to a fault). By virtue of this configuration of the control unit, the reliability of the current-limiting circuit is markedly increased once again. Even when the first bypass element does not close in response to the first bypass signal (for example because a fault occurs in the current-limiting circuit), the second bypass signal is generated by the control unit and thereby the second bypass element is instructed to bypass the capacitor unit. Therefore, even in this case, the magnitude of the alternating current can be limited in a reliable manner by the current-limiting circuit.

The current-limiting circuit can have a first current-measuring device for measuring the electrical current flowing through the coil unit. The current-limiting circuit can have a second current-measuring device for measuring the electrical current flowing through the surge limiter. The current-limiting circuit can have a third current-measuring device for measuring the electrical current flowing through one of the two coils of the coil unit.

Furthermore disclosed is a method for limiting the magnitude of an alternating current (flowing through a system connection point of a power supply system), in which the alternating current is conducted through an electrical series circuit comprising a coil unit and a capacitor unit, and in order to limit the magnitude of the alternating current, the capacitor unit is electrically bypassed, as a result of which the inductive reactance of the series circuit is increased (and owing to the increase in the inductive reactance, the magnitude of the alternating current is limited).

At the rated frequency of the alternating current, the capacitive reactance of the capacitor unit compensates for the inductive reactance of the coil unit. In other words, the capacitance of the capacitor unit and the inductance of the coil unit are selected such that at the rated frequency of the alternating current, the absolute value of the capacitive reactance of the capacitor unit corresponds to the absolute value of the inductive reactance of the coil unit.

This method can be configured in such a way that (in the event of the occurrence of an excess current) the capacitor unit is electrically bypassed by means of a first bypass branch, which has a first bypass element, in particular a power semiconductor switch. The first bypass branch can be connected electrically in parallel with the capacitor unit. The electrical current flowing through the coil unit is measured. The occurrence of an excess current is identified when the electrical current flowing through the coil unit exceeds a first threshold value or when the electrical current flowing through a surge limiter (of the capacitor unit) exceeds a second threshold value.

The method can proceed in such a way that the capacitor unit is electrically bypassed by means of a second bypass branch when a fault occurs during bypassing of the capacitor unit by means of the first bypass branch, wherein the second bypass branch has a second bypass element, in particular a spark gap.

The second bypass branch can be connected electrically in parallel with the capacitor unit.

The method can also proceed in such a way that in addition to the bypassing of the capacitor unit by means of the first bypass branch or by means of the second bypass branch, the second bypass element is electrically bypassed by means of a third bypass branch, which is connected electrically in parallel with the second bypass element and has a third bypass element, in particular a mechanical bypass switch.

The method can proceed in such a way that the coil unit has two electrical coils connected in parallel, the current flowing through the coils is monitored, and an alarm signal is generated as soon as the ratio of the currents flowing through the two coils changes by more than a (third) threshold value (coil current threshold value).

The above-specified methods have the same advantages as have been cited above in connection with the current-limiting circuit.

The invention will be explained in more detail below with reference to exemplary embodiments. The same reference symbols here refer to identical or functionally identical elements.

DESCRIPTION OF THE INVENTION

Figure 1:
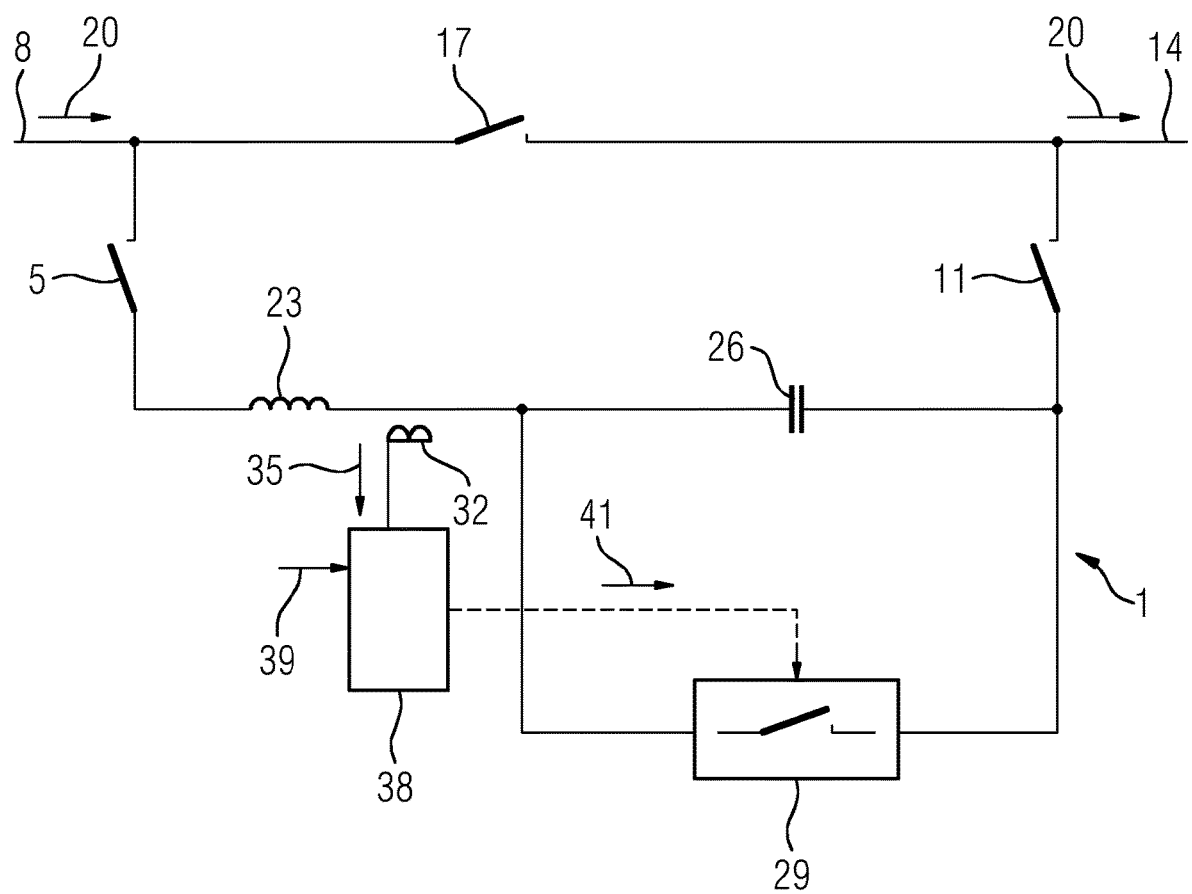
FIG. 1 shows an exemplary embodiment of the current-limiting circuit.
Figure 2:
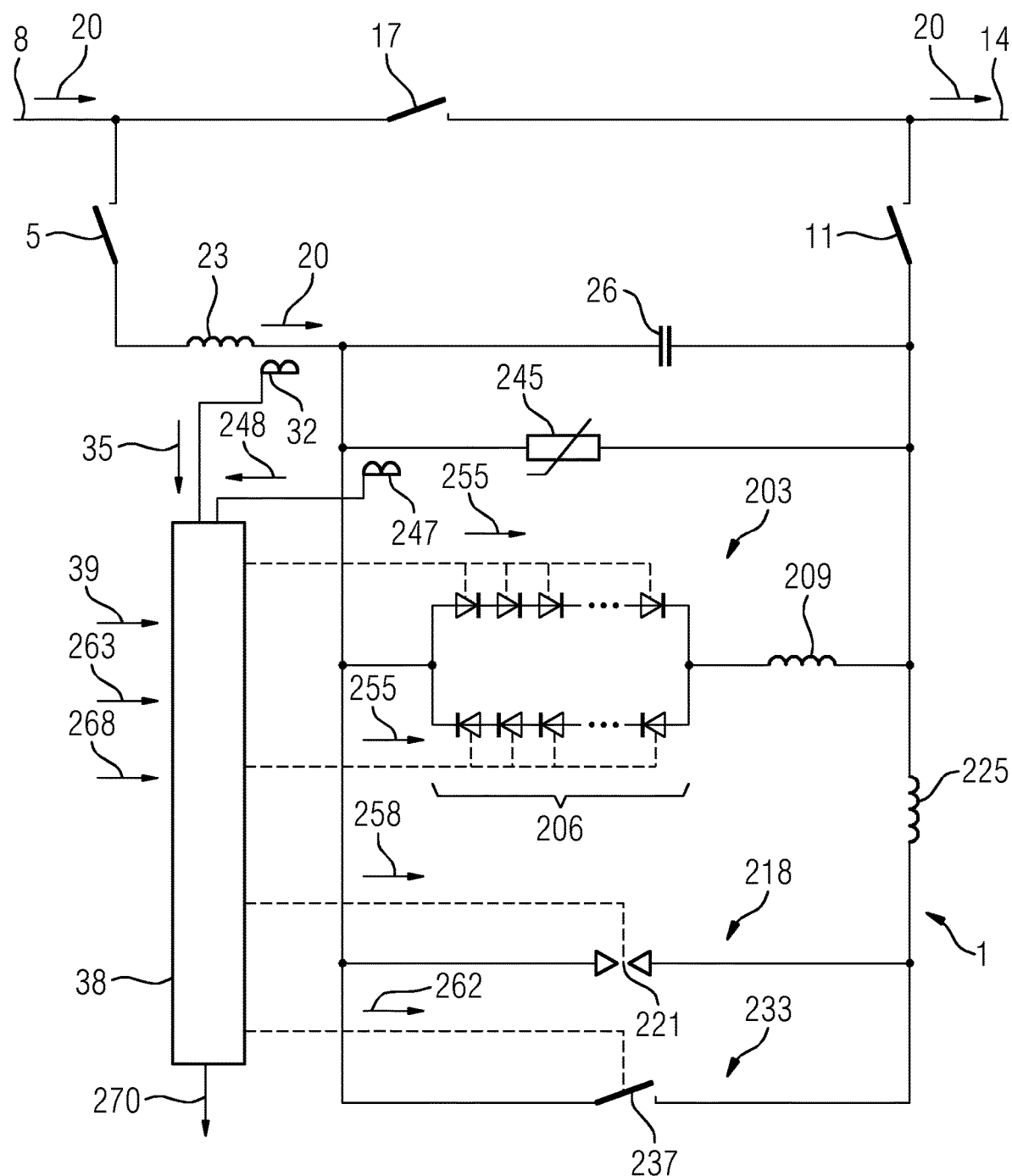
FIG. 2 shows a more detailed exemplary embodiment of the current-limiting circuit.
Figure 3:
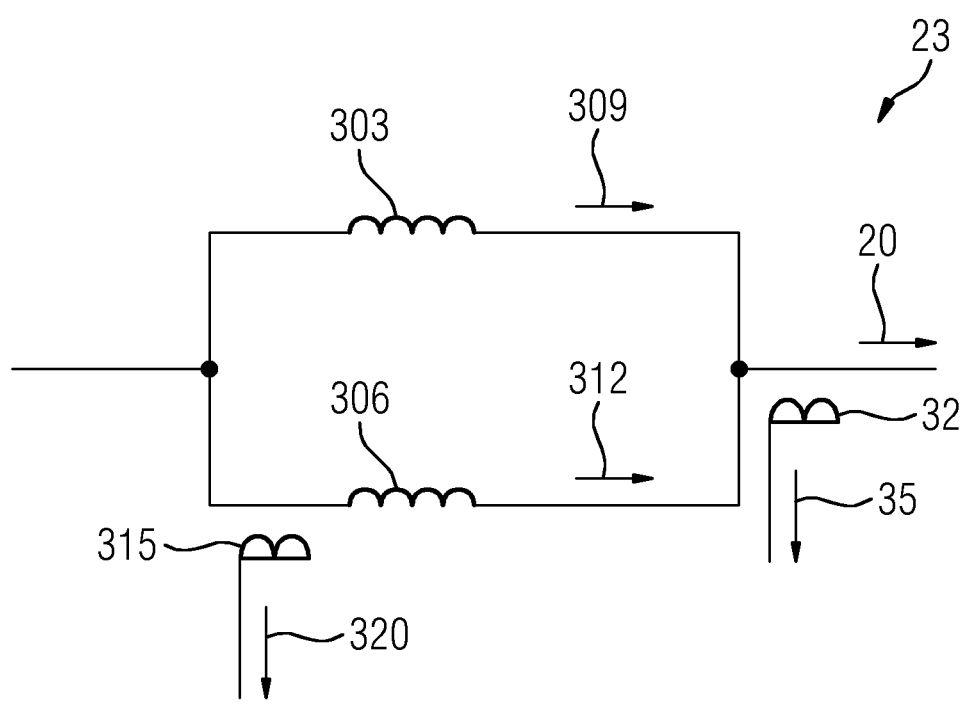
FIG. 3 shows an exemplary embodiment of the coil unit.

Although the exemplary embodiments are illustrated in FIGS. 1 to 3 with a single-phase configuration, in practice they can also have a polyphase, in particular three-phase, configuration.

FIG. 1 shows an exemplary embodiment of a current-limiting circuit 1. The current-limiting circuit 1 is electrically connected to a first system connection point 8 by means of a first switch disconnector 5 and to a second system connection point 14 by means of a second switch disconnector 11. The first system connection point 8 and the second system connection point 14 are connected to a power supply system (not illustrated). The first system connection point 8 is electrically connectable to the second system connection point 14 by means of a third switch disconnector 17 (bypass disconnector 17). When the bypass disconnector 17 is closed, an alternating current 20 flows directly from the first system connection point 8 via the bypass disconnector 17 (bypass 17) to the second system connection point 14. In this case, the alternating current 20 does not flow via the current-limiting circuit. When, however, the bypass disconnector 17 is open and the first switch disconnector 5 and the second switch disconnector 11 are closed, the alternating current 20 flows from the first system connection point 8 via the current-limiting circuit 1 to the second system connection point 14. Then, the current-limiting circuit 1 is effective.

In this case, the alternating current 20 flows from the first system connection point 8 via the first switch disconnector 5, a coil unit 23, a capacitor unit 26 and the second switch disconnector 11 to the second system connection point 14. The electrical inductance of the coil unit 23 and the electrical capacitance of the capacitor unit 26 are selected in such a way that, at the rated frequency f of the alternating current, the absolute value of the capacitive reactance $X_C$ of the capacitor unit 26 corresponds to the absolute value of the inductive reactance $X_L$ of the coil unit 23. At the rated frequency f of the alternating current, therefore, the capacitive reactance $X_C$ of the capacitor unit 26 compensates for the inductive reactance $X_L$ of the coil unit 23. Therefore, the following equation applies for the inductance L of the coil unit 23 and the capacitance C of the capacitor unit 26:

$$|X_L| = \omega L = \frac{1}{\omega C} = |X_C|$$

where the angular frequency is $\omega = 2\pi f$, where f is the rated frequency f of the alternating current. At the rated frequency f of the alternating current, therefore, (when the bypass device 29 is open) the capacitance of the capacitor unit 26 compensates for the inductance of the coil unit 23, with the result that the inductive reactance of the coil unit does not have any influence on the alternating current 20. For the alternating current 20, the series circuit comprising the coil unit and the capacitor unit then in the ideal case has the impedance of zero; in practice the series circuit can have a low impedance owing to possibly not always ideal compensation of the inductive reactance by the capacitive reactance. This has the consequence that the flow of the alternating current 20 from the first system connection point 8 to the second system connection point 14 is not or is only very slightly impaired by the series circuit comprising the coil unit 23 and the capacitor unit 26. In this case, the current-limiting circuit 1 does not have any or only a very slight undesired influence on the power transmission.

In other words, the coil unit 23 and the capacitor unit 26 are tuned to the electrical frequency/rated frequency of the alternating current (i.e. to the rated frequency of the power supply system to be protected). Therefore, the impedance of the series circuit comprising the coil unit 23 and the capacitor unit 26 at the rated frequency of the alternating current is ideally zero. Therefore, the power flow through the current-limiting circuit is not impaired in the normal case.

The capacitor unit 26 can be bypassed electrically by means of bypass device 29; in the exemplary embodiment in FIG. 1, the bypass device 29 is illustrated symbolically as a switch, which, in its closed state, electrically bypasses the capacitor unit 26. The bypass device 29 is connected in parallel with the capacitor unit 26. The bypass device 29 is used for electrically bypassing the capacitor unit 26 in the event of the occurrence of an excess current.

The alternating current flowing through the coil unit 23 is measured by means of a first current sensor 32 (first current-measuring device 32). The first current sensor 32 is therefore used for measuring the electrical current flowing through the coil unit 23. The first current sensor 32 can be configured as an instrument transformer, for example. A first current measurement signal 35 passes from the first current sensor 32 to a control unit 38 of the current-limiting circuit 1. As soon as the control unit 38 identifies that the current flowing through the coil unit 23 is too high (i.e. the current 20 flowing through the coil unit 23 exceeds a first threshold value 39), the control unit 38 transmits a bypass signal 41 to the bypass device 29. Thereupon, the bypass device 29 bypasses the capacitor unit 26. The alternating current 20 then no longer flows through the capacitor unit 26, but through the bypass device 29. As a result, the capacitive reactance $X_C$ of the capacitor 26 is short-circuited, with the result that now only the inductive reactance $X_L$ of the coil unit 23 is effective for the alternating current 20. This inductive reactance $X_L$ limits the alternating current 20, with the result that the current-limiting circuit 1 now implements its current-limiting function.

When the alternating current 20 flowing through the coil unit 23 again assumes its normal value (for example because a short circuit on the power supply system has been eliminated), the control unit 38 identifies, on the basis of the first current measurement signal 35, the presence of normal current ratios (i.e. the current 20 flowing through the coil unit 23 falls below the first threshold value 39). The control unit 38 then ends the transmission of the bypass signal 41 to the bypass device 29. Thereupon, the bypass device 29 opens (i.e. the bypass device 29 transfers from the closed state to the open state), and the alternating current 20 flowing through the bypass device 29 switches back to the capacitor unit 26. Thereupon, the capacitor unit 26 is again effective for the alternating current 20, the capacitive reactance $X_C$ of the capacitor unit compensates again for the inductive reactance $X_L$ of the coil unit, and the alternating current 20 can flow unimpeded (or virtually unimpeded) through the current-limiting circuit 1.

FIG. 2 shows, in detailed form, the design of the bypass device 29. The bypass device 29 has a first bypass branch 203 for bypassing the capacitor unit 26. The first bypass branch 203 has a first bypass element 206. The first bypass element 206 may be, for example, a (bidirectional) power semiconductor switch 206. This power semiconductor switch 206 can have semiconductor valves (connected back-to-back in parallel) which can be switched on and off, in particular thyristors (connected back-to-back in parallel). The power semiconductor switch 206, in particular the thyristors, can be switched quickly. A first damping circuit 209 is connected electrically in series with the first bypass element 206. The first damping circuit 209 can be configured, for example, as a further coil unit 209. The first damping circuit 209 limits the electrical current flowing through the first bypass element 206 during switching-on of the first bypass element 206. The power semiconductor switch 206 and the first damping circuit 209 are elements of the first bypass branch 203. The first bypass branch 203 is connected in parallel with the capacitor unit 26. When the first bypass element 206 has been switched on, the first bypass branch 203 bypasses the capacitor unit 26, and the alternating current 20 switches from the capacitor unit 26 to the first bypass branch 203.

The bypass device 29 has a second bypass branch 218, which is likewise used for bypassing the capacitor unit 26. The second bypass branch 218 is connected electrically in parallel with the first bypass branch 203. The second bypass branch 218 has a second bypass element 221. The second bypass element 221 may be, for example, a spark gap 221. Furthermore, the second bypass branch 218 has a second damping circuit 225; this second damping circuit 225 may be, for example, an additional coil unit 225. The second damping circuit 225 is arranged electrically in series with the second bypass element 221. The second damping circuit 225 is used for limiting the current flowing through the second bypass element 221 during switching-on of the second bypass element 221 (triggering of the spark gap 221).

The bypass device 29 has a third bypass branch 233 for bypassing the second bypass element 221. The third bypass branch 233 is connected electrically in parallel with the second bypass element 221. The third bypass branch 233 has a third bypass element 237. The third bypass element 237 may be, for example, a mechanical bypass switch 237.

The capacitor unit 26 is provided with a surge limiter 245. This surge limiter 245 may be, for example, a varistor 245. The surge limiter 245 is connected in parallel with the capacitor unit 26 and forms part of the bypass device 29. As soon as a surge occurs across the capacitor unit 26, the surge limiter 245 turns on, with the result that the current switches from the capacitor unit 26 to the surge limiter 245. As a result, the capacitor unit 26 is protected from the surge.

In addition to the first current sensor 32 mentioned already in connection with FIG. 1, the bypass device 29 has a second current sensor 247 (second current-measuring device 247) for measuring the electrical current flowing through the surge limiter 245. The second current sensor 247 transmits a second current measurement signal 248 to the control unit 31.

The control unit 38 can emit a first bypass signal 255 to the first bypass element 206. In response to the first bypass signal 255, the first bypass element 206 closes, i.e. the first bypass element 206 bypasses the capacitor unit 26. For example, in the case of the first bypass signal 255, trigger pulses are conducted to the thyristors of the power semiconductor switch 206, with the result that the thyristors turn on and the power semiconductor switch 206 is closed. Furthermore, the control unit 38 can emit a second bypass signal 258 to the second bypass element 221. In response to the second bypass signal 258, the second bypass element 221 closes, i.e. the second bypass element 221 bypasses the capacitor unit 26. Furthermore, the control unit 38 can emit a third bypass signal 262 to the third bypass element 237. In response to the third bypass signal 262, the third bypass element 237 bypasses the second bypass element 221.

The control unit 38 generates the first bypass signal 255 when the electrical current flowing through the coil unit 23 exceeds the first threshold value 39 or when the electrical current flowing through the surge limiter 245 exceeds a second threshold value 263. In this case, the current flowing through the coil unit is measured by means of the first current sensor 32, and the current flowing through the surge limiter 245 is measured by means of the second current sensor 247. The first bypass signal 255 is intended to cause the first bypass element 206 to close. The capacitor unit 26 is therefore also then electrically bypassed as soon as a surge occurs across the capacitor unit. If, however, in response to the first bypass signal 255, the first bypass element 206 does not close (because, for example, the first bypass element 206 is defective or the signal transmission between the control unit 38 and the first bypass element 206 is disrupted), the control unit 38 generates the second bypass signal 258 and transmits this to the second bypass element 221. The second bypass signal 258 is intended to cause the second bypass element 221 to close. As a result, the current is effectively limited by means of the current-limiting circuit 1 even when, in the case of the first bypass element 206, a fault should occur.

Furthermore, the control unit 38 transmits the third bypass signal 262 to the third bypass element 237 together with the first bypass signal 255 and together with the second bypass signal 258 (or with a slight time delay after the first bypass signal 255 or the second bypass signal 258). In response to the third bypass signal 262, the third bypass element 237 closes and therefore bypasses the second bypass element 221. Thereupon, the alternating current previously flowing through the first bypass element 206 or through the second bypass element 221 switches to the third bypass element 237. This switchover takes place because the third bypass element 237, in the closed state, has a very low nonreactive resistance. The third bypass element is preferably configured as a mechanical bypass switch. Using the third bypass element 237, the alternating current 20 can be conducted for a comparatively long period of time without the first bypass element 206 or the second bypass element 221 being subjected to an excessively high load.

The second bypass element 221/the spark gap 221 is therefore a quick bypass element and bypasses the capacitor unit 26 when the first bypass element 206/the power semiconductor switch 206 does not close owing to a defect.

FIG. 3 illustrates that the coil unit 23 can preferably have two coils connected electrically in parallel: a first coil 303 and a second coil 306 connected electrically in parallel. The alternating current 20 flowing through the coil unit 28 is split into a first partial current 309, which flows through the first coil 303, and a second partial current 312, which flows through the second coil 306. The total alternating current 20 is measured by means of the first current sensor 32, and the second partial current 312 flowing through the second coil 306 is measured by means of a third current sensor 315. By evaluation of the first current measurement signal 35 originating from the first current sensor 32 and a third current measurement signal 320 originating from the third current sensor 315, the first partial current 309 and the second partial current 312 are determined.

If the first coil 303 and the second coil 306 each have an electrical inductance of the same magnitude, the alternating current 20 is split uniformly between the first coil 303 and the second coil 306: the first partial current 309 then has precisely the same magnitude as the second partial current 312. If there is now a defect, for example, at the first coil 303 (for example a turn-to-turn fault), the electrical inductance of the first coil 303 changes. In the event of a turn-to-turn fault, the electrical inductance of the first coil 303 is reduced. As a result, the first partial current 309 increases in magnitude. The control unit 38 monitors the ratio of the first partial current 3092 the second partial current 312. As soon as this ratio changes significantly (for example by more than a third threshold value 268; cf. FIG. 2), the control unit 38 generates an alarm signal 270 (cf. FIG. 2). This alarm signal 270 means that a defect has occurred in the coil unit 23.

For example, the alarm signal 270 can be generated as soon as the first partial current 309 is greater than the second partial current 312 by more than 5% (third threshold value 268 corresponds to 5%). Alternatively, it is also possible to form a differential current from the first partial current and the second partial current (differential current=first partial current 309—second partial current 312), and the alarm signal 270 can be generated as soon as the differential current exceeds a threshold value (third threshold value 268 corresponds to this threshold value). By virtue of this coil unit defect identification, the reliability of the current-limiting circuit is further markedly increased.

Figure 4:
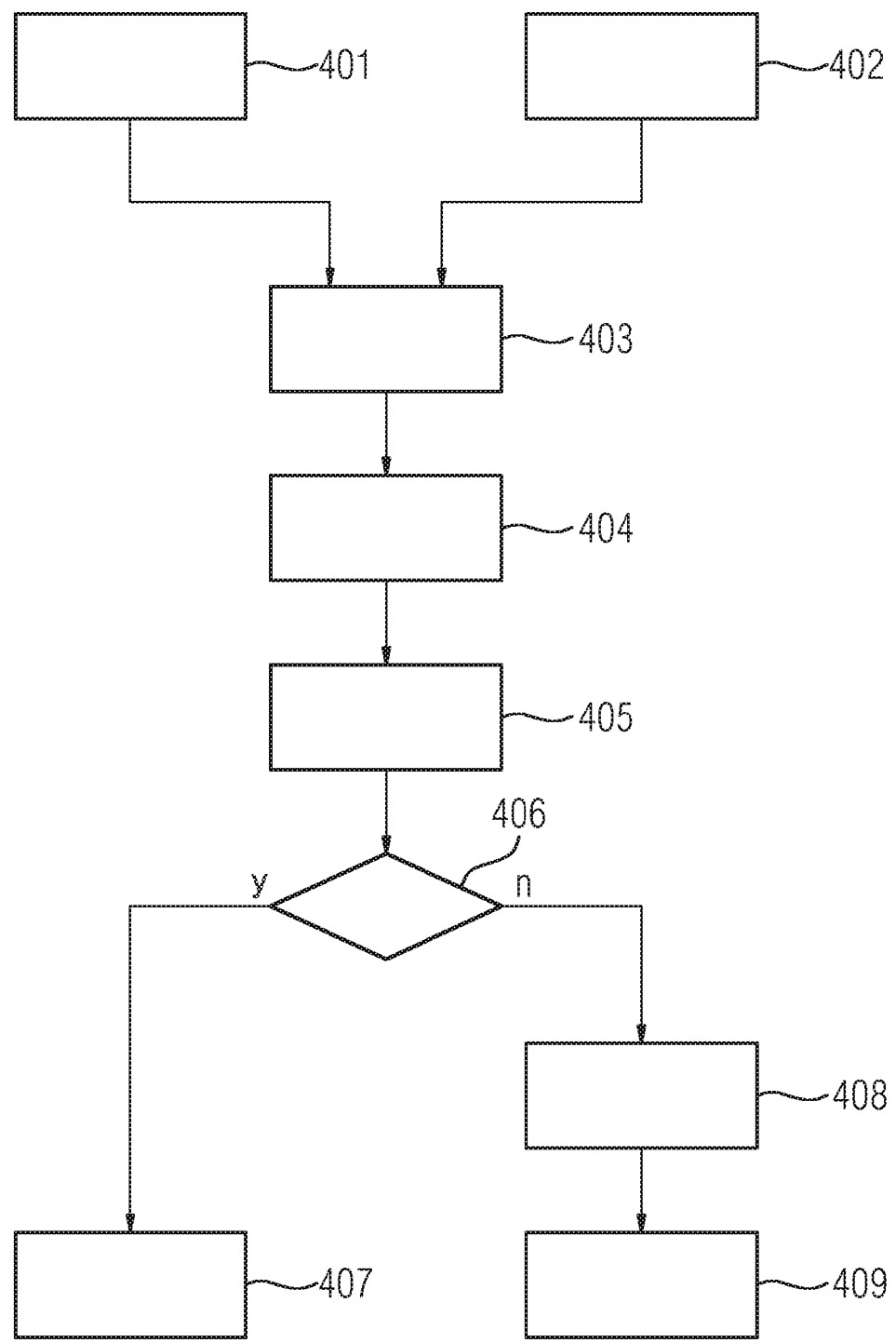
FIG. 4 shows an exemplary method sequence.

FIG. 4 illustrates, using a flowchart, an exemplary embodiment of a method for limiting the magnitude of an alternating current. In this case, the method steps listed below occur in blocks 401 to 409.

Block 401:
Determining whether the electrical current flowing through the coil unit exceeds the first threshold value 39

Block 402:
Determining whether the electrical current flowing through the surge limiter exceeds the second threshold value 263

Block 403:
OR combination of the outputs of block 401 and block 402

Block 404:
Generation of the first bypass signal 255, which is intended to cause the first bypass element 206 to close (for example, the power semiconductor switch to close)

Block 405:
Generation with a time delay of the second bypass signal 258, which is intended to cause the second bypass element 221 to close (for example, triggering of the spark gap)

Block 406:
Identifying whether the first bypass element 206 closes

Block 407 (when first bypass element closes):
Closing of the third bypass element 237 (for example, mechanical switch)

Block 408 (when first bypass element does not close, for example owing to a defect):
Closing of the second bypass element 221 (for example spark gap)

Block 409:
Closing of the third bypass element 237 (for example mechanical switch)

In respect of block 404: optionally, the first bypass signal 255 and the third bypass signal 262 are generated simultaneously. However, the first bypass element 206 closes more quickly than the third bypass element 237 because the first bypass element 206 is a quicker bypass element than the third bypass element 237. For example, the first bypass element is a (relatively quick) power semiconductor switch, whereas the third bypass element is a (relatively slow) mechanical bypass switch. As a result, the alternating current 20 flowing through the capacitor unit 26 can switch relatively quickly to the first bypass branch 203 with the first bypass element 206 and (after closing of the third bypass element 237) can switch to the third bypass branch 233 with the third bypass element 237.

In respect of block 405: optionally, the second bypass signal 258 and the third bypass signal 262 are generated simultaneously. However, the second bypass element 221 closes more quickly than the third bypass element 237 because the second bypass element 221 is a quicker bypass element than the third bypass element 237. For example, the second bypass element 221 is a (relatively quick) spark gap, whereas the third bypass element is a (relatively slow) mechanical bypass switch. As a result, the alternating current 20 flowing through the capacitor unit 26 in the event of a defect in the first bypass branch 203 can switch relatively quickly to the second bypass branch 218 with the second bypass element 221 and can switch (after closing of the third bypass element 237) to the third bypass branch 233 with the third bypass element 237.

Between block 404 and block 405 there is a time delay, with the result that the bypass signals mentioned in block 405 are generated slightly later than the bypass signals mentioned in block 404. This ensures that, in response to the first bypass signal 255 from block 404, first the first bypass element 206 in the first bypass branch 203 closes. When they first bypass element 206 has closed, there is then no voltage drop or only a very small voltage drop across the second bypass element 221, with the result that closing of the second bypass element 221 no longer has a substantial effect or (if the second bypass element 221 is configured as a spark gap) this spark gap 221 is no longer triggered at all. Closing of the second bypass element (in response to the second bypass signal 258) therefore only comes into effect when the first bypass element does not close (in response to the first bypass signal 255) owing to a fault.

A current-limiting circuit and a method for limiting the magnitude of an alternating current have been described in which (when the bypass device is open) in the ideal case there is an impedance of zero (or in reality a very low impedance) and therefore in the normal case the alternating current flowing is not impeded or influenced. The normal case is the case where there is no excess current (in particular no short-circuit current owing to a short circuit). Only when an excess current occurs is the capacitor unit 26 bypassed (short-circuited) by the bypass device 29, as a result of which the coil unit 23 becomes effective with respect to the alternating current flowing and quickly limits this alternating current. In general, the capacitor unit 26 is bypassed by the first (quick) bypass branch 203 of the bypass device 29; in particular the capacitor unit 26 is bypassed by the (quick) power semiconductor switch 206, which is arranged in the first bypass branch 203. If a fault occurs in the first bypass branch 203 (with the result that bypassing by means of the first bypass branch 203 does not take place), the capacitor unit 26 is bypassed by means of the second bypass branch 218, in particular by means of the spark gap 221. For longer-term conduction of the alternating current, furthermore, a third bypass branch 233 with a third bypass element 237, in particular with a mechanical bypass switch 237, is provided, which can conduct the alternating current for a comparatively long period of time and with low losses.

The bypass device therefore operates reliably even in the event of the occurrence of a defect in the first bypass branch or in the event of a disruption to the signal transmission between the control unit 38 and the first bypass element 206, with the result that there is a robust and reliable current-limiting circuit.

The coil unit 23 limits the electrical current, in particular the electrical short-circuit current. The capacitor unit 26 generates the zero impedance of the series circuit comprising the coil unit and the capacitor unit (in the non-bypassed state) in the normal case/normal operating case. The surge limiter 245 protects the capacitor unit from a surge, in particular during the occurrence of a fault or short circuit. The power semiconductor switch 206 ensures quick bypassing of the capacitor unit in the event of an excess current and as a rule (i.e. when there is no defect in the current-limiting circuit) is used for bypassing the capacitor unit 26. Quick bypassing of the capacitor unit 26 therefore takes place generally using the power semiconductor switch 206, which has thyristors back-to-back in parallel. The first damping circuit 209/further coil unit 209 limits the current through the power semiconductor switch 206 and the magnitude of the change in current di/dt which occurs at the power semiconductor switch 206.

The current flow through the power semiconductor switch is therefore limited by means of the first damping circuit 209/further coil unit 209, which is connected electrically in series with the power semiconductor switch. The second bypass element 221, in particular the spark gap 221, provides the possibility of alternative bypassing of the capacitor unit in the case where the first bypass element 206/the first power semiconductor switch 206 fails. As a result, complete redundancy is achieved. The second damping circuit 225 limits the current through the second bypass element 221/spark gap 221 and through the third bypass element 237/mechanical bypass switch 237 and enables sufficient damping of the discharge current of the capacitor unit 26. The third bypass element 237/the mechanical bypass switch 237 protects the surge limiter 245, the first bypass element 206 and the second bypass element 221. The third bypass element 237 can also be closed when bypassing of the capacitor unit 26 is necessary for different reasons than excess current, i.e., for example, in the event of a different fault on the power supply system. The bypass disconnector 17, the first switch disconnector 5 and the second switch disconnector 11 are used for incorporating the current-limiting circuit in the power supply system (power transmission system) and for disconnecting the current-limiting circuit from the power supply system.

Owing to the current flowing through the coil unit 23 and/or the current flowing through the surge limiter 245, it is identified when there is an excess current and when, consequently, the bypass device 29 needs to be closed. The use of two independent currents ensures that the current-limiting circuit 1 operates reliably even in the event of a communication error or a failure of a current sensor. As soon as one of the two currents exceeds a respectively associated threshold value, the first bypass signal is generated and, as a result, bypassing of the capacitor unit is induced/activated. Then, the method described in connection with FIG. 4 proceeds.

A current-limiting circuit and a method for limiting the magnitude of an alternating current have been described with which, in the event of an excess current, the current can be limited quickly. In the normal case (i.e. when there is no excess current), the current-limiting circuit does not influence or barely influences the alternating current flowing. Owing to the presence of a plurality of bypass branches in the bypass device 29, a high degree of reliability of the current-limiting circuit is achieved, in particular even in the event of the occurrence of component faults or communication errors in individual sections of the current-limiting circuit. By virtue of the limiting of the current (in particular in the case of the occurrence of short circuits), the dynamic and thermal loading on the components in the power supply system is markedly reduced, with the result that the service life of these components can be markedly extended.

The invention claimed is:

1. A current-limiting circuit for limiting a magnitude of an alternating current, the current-limiting circuit comprising:
   a coil unit and a capacitor unit that are connected electrically in series; and
   a bypass device connected for electrically bypassing said capacitor unit when an overcurrent occurs;
   said bypass device having a first bypass branch for bypassing said capacitor unit, a second bypass branch for bypassing said capacitor unit connected electrically in parallel with said first bypass branch, and a third bypass branch;
   said first bypass branch including a first bypass element, said second bypass branch including a second bypass element, and said third bypass branch including a third bypass element; and
   said third bypass branch being connected electrically in parallel with said second bypass element for bypassing said second bypass element.

2. The current-limiting circuit according to claim 1, wherein said capacitor unit has a given capacitance and said coil unit has a given inductance, and wherein the capacitance and the inductance are selected such that, at a rated frequency of the alternating current, an absolute value of a capacitive reactance of said capacitor unit equals an absolute value of an inductive reactance of said coil unit.

3. The current-limiting circuit according to claim 1, wherein said capacitor unit is provided with a surge limiter.

4. The current-limiting circuit according to claim 3, wherein said surge limiter is a varistor.

5. The current-limiting circuit according to claim 1, wherein said coil unit comprises two electrical coils connected in parallel.

6. A current-limiting circuit for limiting a magnitude of an alternating current, the current-limiting circuit comprising:
   a coil unit and a capacitor unit that are connected electrically in series; and
   a bypass device connected for electrically bypassing said capacitor unit when an overcurrent occurs;
   said bypass device having a first bypass branch for bypassing said capacitor unit, said first bypass branch including a first bypass element;
   said bypass device having a second bypass branch for bypassing said capacitor unit, said second bypass branch being connected electrically in parallel with said first bypass branch, and said second bypass branch including a second bypass element;

a control unit configured to generate a first bypass signal when the electrical current flowing through said coil unit exceeds a first threshold value, wherein the first bypass signal causes said first bypass element to close;

wherein said control unit is configured to generate the first bypass signal even when the electrical current flowing through a surge limiter of said capacitor unit exceeds a second threshold value.

7. The current-limiting circuit according to claim 6, wherein said bypass device has a first bypass branch for bypassing said capacitor unit, said first bypass branch including a first bypass element.

8. The current-limiting circuit according to claim 7, wherein said first bypass element of said first bypass branch is a power semiconductor switch.

9. The current-limiting circuit according to claim 7, wherein said bypass device includes a second bypass branch for bypassing said capacitor unit, said second bypass branch is connected electrically in parallel with said first bypass branch, and said second bypass branch has a second bypass element.

10. The current-limiting circuit according to claim 9, wherein said second bypass element of said second bypass branch is a spark gap.

11. The current-limiting circuit according to claim 9, wherein said bypass device includes a third bypass branch for bypassing said second bypass element, wherein said third bypass branch is connected electrically in parallel with said second bypass element, and said third bypass branch has a third bypass element.

12. The current-limiting circuit according to claim 11, wherein said third bypass element of said third bypass branch is a mechanical bypass switch.

13. The current-limiting circuit according to claim 9, further comprising a control unit configured to generate a first bypass signal when the electrical current flowing through said coil unit exceeds a first threshold value, wherein the first bypass signal causes said first bypass element to close.

14. A current-limiting circuit for limiting a magnitude of an alternating current, the current-limiting circuit comprising:
    a coil unit and a capacitor unit that are connected electrically in series; and
    a bypass device connected for electrically bypassing said capacitor unit when an overcurrent occurs;
    said bypass device having a first bypass branch for bypassing said capacitor unit, said first bypass branch including a first bypass element;
    said bypass device having a second bypass branch for bypassing said capacitor unit, said second bypass branch being connected electrically in parallel with said first bypass branch, and said second bypass branch including a second bypass element;
    a control unit configured to generate a first bypass signal when the electrical current flowing through said coil unit exceeds a first threshold value, wherein the first bypass signal causes said first bypass element to close;
    wherein said control unit is configured to generate a second bypass signal causing said second bypass element to close when said first bypass element does not close in response to the first bypass signal.

15. A method of limiting a magnitude of an alternating current, the method comprising:
    conducting the alternating current through an electrical series circuit of a coil unit and a capacitor unit;
    limiting the magnitude of the alternating current by electrically bypassing the capacitor unit to thereby increase an inductive reactance of the series circuit;
    bypassing the capacitor unit by way of a second bypass branch when a fault occurs during the bypassing of the capacitor unit by way of a first bypass branch, wherein the second bypass branch has a second bypass element;
    in addition to bypassing the capacitor unit by way of the first bypass branch or by way of the second bypass branch, electrically bypassing the second bypass element by way of a third bypass branch, which is connected electrically in parallel with the second bypass element and which has a third bypass element.

16. The method according to claim 15, which comprises bypassing the capacitor unit by way of a first bypass branch, which has a first bypass element.

17. The method according to claim 16, wherein the first bypass element of the first bypass branch is a power semiconductor switch.

18. A method of limiting a magnitude of an alternating current, the method comprising:
    conducting the alternating current through an electrical series circuit of a coil unit and a capacitor unit;
    limiting the magnitude of the alternating current by electrically bypassing the capacitor unit to thereby increase an inductive reactance of the series circuit;
    monitoring respective currents flowing through two parallel-connected electrical coils of the coil unit; and
    generating an alarm signal as soon as a ratio of the currents flowing through the two electrical coils of the coil unit changes by more than a threshold value.

19. The method according to claim 18, which comprises bypassing the capacitor unit by way of a second bypass branch when a fault occurs during the bypassing of the capacitor unit by way of a first bypass branch, wherein the second bypass branch has a second bypass element.

20. The method according to claim 19, which comprises, in addition to bypassing the capacitor unit by way of the first bypass branch or by way of the second bypass branch, electrically bypassing the second bypass element by way of a third bypass branch, which is connected electrically in parallel with the second bypass element and which has a third bypass element.

\* \* \* \* \*